March 19, 1968 D. DANON 3,374,112
METHOD AND APPARATUS FOR CONTROLLED DEPOSITION OF
A THIN CONDUCTIVE LAYER
Filed March 5, 1964 2 Sheets-Sheet 1
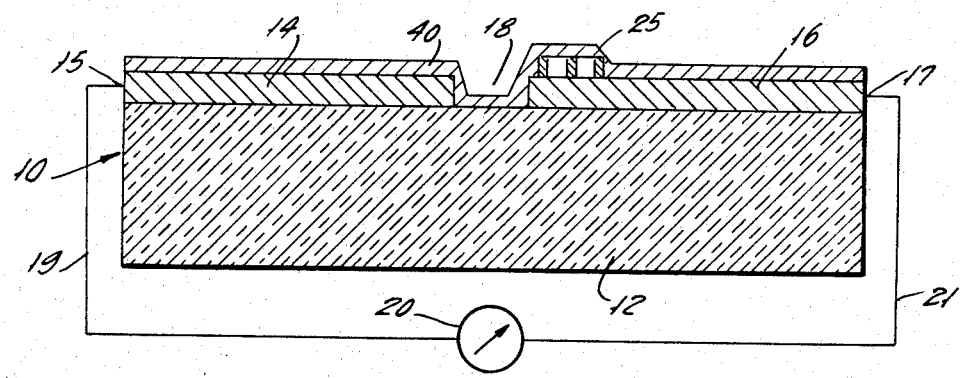
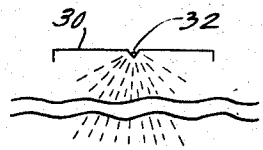
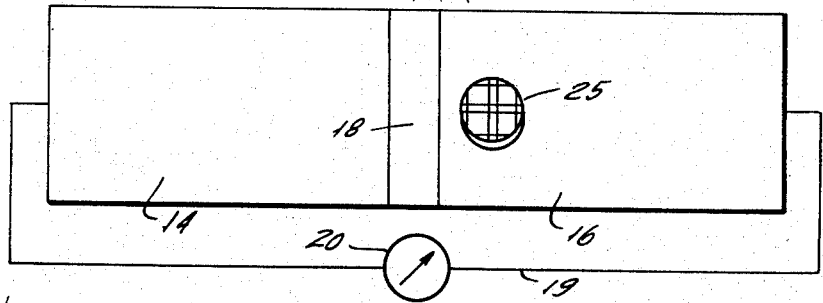
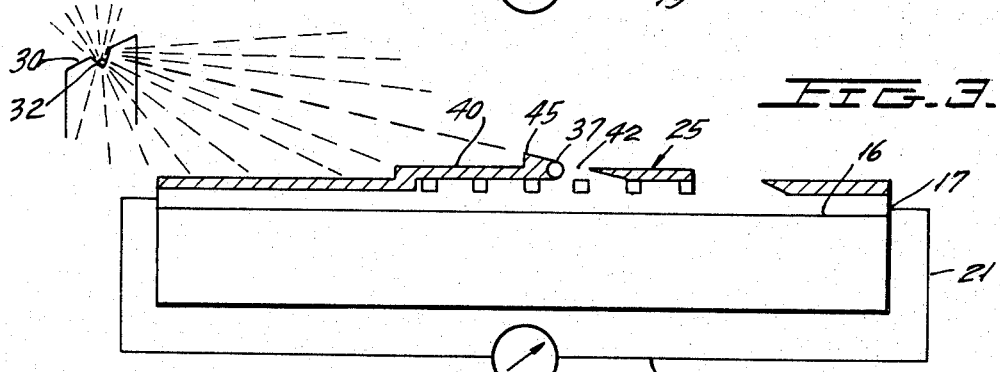
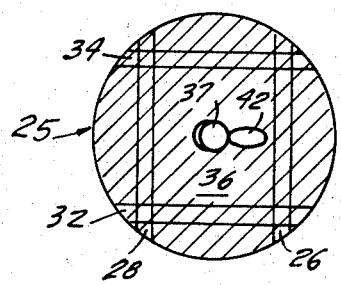
INVENTOR.
DAVID DANON
BY
OSTROLENK, FABER, GERB & SOFFEN
ATTORNEYS March 19, 1968     D. DANON     3,374,112
METHOD AND APPARATUS FOR CONTROLLED DEPOSITION OF
A THIN CONDUCTIVE LAYER
Filed March 5, 1964     2 Sheets-Sheet 2

INVENTOR.
DAVID DANON
BY
OSTROLENK, FABER, GERB & SOFFEN
ATTORNEYS

United States Patent Office 3,374,112
Patented Mar. 19, 1968

3,374,112
METHOD AND APPARATUS FOR CONTROLLED DEPOSITION OF A THIN CONDUCTIVE LAYER
David Danon, Rehovoth, Israel, assignor to Yeda Research and Development Co. Ltd., Rehovoth, Israel
Filed Mar. 5, 1964, Ser. No. 349,552
15 Claims. (Cl. 117—226)

This invention relates to a method and apparatus for accurately depositing a thin conductive layer of reproducible thickness on a member to be coated, and is particularly directed to an improved method for shadow casting a specimen grid as used in conjunction with electron microscopy.

It is oftentimes desired to deposit a thin conductive layer as by deposition under vacuum, of an accurately predetermined thickness, with such deposition being repeatable with a high degree of accuracy. One such application is in the field of electron microscopy, wherein the specimen grid is coated with an accurately determined thickness of electron scattering material, such as a heavy metal, to provide a shadow cast image of the specimen. Such a shadow cast specimen then permits a more detailed analysis of the characteristics of the particular specimen, as is well known in the field of electron microscopy, with the accuracy of analysis being related to the degree of accuracy in the thickness of the specimen coating.

Various techniques have been previously proposed for depositing such a thin layer of conductive material in an accurately reproducible manner. These techniques usually involve estimating the thickness of the metallic layer while the specimen is still under vacuum, and have been subject to various inaccuracies and complexities, thereby seriously detracting from their practical utility. My invention advantageously provides an extremely simple apparatus and method, which has demonstrated a high degree of reproducibility irrespective of symmetry of the source, evaporation rate and other conditions which have heretofore been found to disadvantageously affect the accuracy and reproducibility of results.

Advantageously, I control the thickness of the deposited layer while it is being deposited under vacuum. Basically, my invention includes a novel base holder which has spaced apart conductive regions, with an insulator gap being formed there between. Such a base holder may be formed of a conventional glass slide, with the conductive surfaces being provided by painting on a gold solution, of the type conventionally used in the ceramic or glass decoration art. The painted glass slide is then placed in an oven and raised to a suitable temperature, such that the gold becomes firmly bonded to the glass so as to provide smooth surfaces of extremely low resistivity upon the glass member. Opposed regions of the electrically conductive gold surfaces are connected to the input terminals of a conventional impedance measuring type device, such as an ohmmeter or suitable electrical bridge. Prior to the initiation of vapor deposition, an infinite resistance will be recorded, corresponding to the gap separation between the conductive regions.

The member to be coated, such as the small grid member used as a specimen holder in an electron microscope, is placed on the base surface adjacent the gap region. The conductive coating is then vapor deposited under vacuum in the conventional manner about the region of the base member containing the specimen holder and the gap. As the vapor deposition proceeds, the gap region is slowly covered with an increasing thickness of conductive material, thereby lowering the resistance thereacross. The resistance is lowered proportionally to the thickness of the coating, such that the ohmmeter reading will give a direct indication of such coating thickness. Hence, the vapor deposition process is carried out until a predetermined reading of the ohmmeter is observed, which predetermined reading corresponds to a desired thickness of coating. Air is then let into the vacuum system; the coated specimen member removed from the vapor depositing apparatus; and the base member cleaned to permit reuse thereof. I have found that by initially calibrating a particular insulated base member in conjunction with a particular vapor deposition physical arrangement, high reproducibility of results have been obtained, of a greater degree of accuracy than has heretofore been possible.

It is, therefore, a basic object of my invention to provide a method for accurately depositing a predetermined thickness of a conductive layer upon a member to be coated.

A further object of my invention is to accurately control the thickness of a vapor deposited conductive layer by observing the impedance variation effected by depositing said conductive layer within a gap region separating conductive members connected to opposed terminals of a conventional ohmmeter.

An additional object of my invention is to provide for a novel method of shadow casting for electron microscopy with increased accuracy and reproducibility of results.

These as well as other objects of my invention will readily become apparent upon a consideration of the following drawings in which:

FIGURE 1 is a simplified cross-sectional view showing the manner in which the depositing of the conductive layer effects an impedance variation in accordance with the basic concepts of my invention.

FIGURE 2 is a plan view of FIGURE 1.

FIGURE 3 is a magnified view corresponding to FIGURE 1, showing the deposition of the conductive layer on a shadow cast specimen for use in electron microscopy.

FIGURE 4 is a plan view of the enlarged specimen holder of FIGURE 3, showing the manner in which the shadow cast image is established.

FIGURE 5 is an exploded perspective view showing the insulated base holder and cooperating adjustable shield member in accordance with a preferred embodiment of my invention.

FIGURE 6 is an end view of the assembled device as shown in FIGURE 5.

FIGURE 7 is a side elevation view, corresponding to FIGURE 6.

Referring initially of FIGURE 1, the accurate depositing of a reproducible conductive layer in accordance with my invention is preferably formed upon a base holder 10. Base holder 10 is formed of an insulated material 12, typically a conventional type glass slide and having an overall thickness of approximately 7 millimeters. The upper surface of the glass member 12 is shown containing spaced apart conductive regions 14, 16 separated by gap region 18. The gap separation 18, intermediate the conductive surfaces 14, 16, may for example be 2 millimeters in width.

I have found that conductive surface 14, 16 may be durably bonded to glass base surface 12 by first cleaning the glass with either or other suitable organic solvent, and then painting on a gold solution, of the type conventionally used in the ceramic arts. After such painting the assembled unit is then introduced to an electric oven or other suitable heating means, and gradually heated to approximately 530° centigrade. The oven is then permitted to slowly cool down to room temperature, in a period taking approximately twenty-four hours. The gold surfaces will be durably bonded to the glass base 12 to form brilliant smooth surfaces providing excellent conductivity and offering substantial resistance to scratching and other handling.

Electrodes 15, 17 are connected to opposed regions of conductive surfaces 14, 16 respectively, with these electrodes being interconnected to a conventional ohmmeter 20 by leads 19, 21 respectively. With the gap separation 18 being maintained between conductive surfaces 14, 16, an infinite resistance will be effected therebetween, such that ohmmeter or other impedance measuring device 20 will indicate an infinite impedance measurement.

The application of a thin conductive layer in accordance with my invention is then carried out by placing the member to be coated 2, which may typically be the conventional type of grid specimen holder used in an electron microscope, on the conductive surface 14 or 16 surface of base support member 10 and adjacent the gap region 18 thereof. Member 25 typically may have an overall diameter of 3 millimeters such that the thickness of coating applied thereto, as by a vapor deposition from source material 32 within filament source 30, is of the same thickness as applied across gap 18. The filament source 30 may typically be formed of tungsten. As the conductive coating 40 is applied across gap 18, a conductive bridge will be placed thereacross, thereby indicating a gradually decreasing impedance variation at meter 20, corresponding to the depth of such conductive coating. The vapor deposition process is then terminated when meter 20 yields a predeterminedly calibrated indication, with such an indication corresponding to a known thickness of vapor deposited material 40. The conductive material of vapor deposited layer 40 may typically be platinum, gold, silver, nickel, chromium, aluminum, or sputtered carbon. With such materials preferably having a high molecular weight, so as to effect optimum electron scattering in conjunction with the electron microscope investigation of the shadow cast specimen, or preparation of carbon films for electron microscopy.

Reference is now made to FIGURES 3 and 4, which show the manner in which the shadow casting is effected by the vapor deposition process of my invention. The specimen holder 25 is preferably formed of a grid pattern of crossed wire members such as 26, 28, 32, 34 so as to form an enclosed region 36 covered with a very thin film of plastic for the reception of specimen 37. Because of the elevated and spaced apart disposition of vapor deposition filament source 30 with respect to the location of specimen holder 25, the vapor deposited material will be built up at region 45, the vertically extending side of the specimen 27 located closer to vapor deposition source 30. Similarly, a non-deposited or shadow cast region will be formed at 42 with such a region having a configuration corresponding to the dimensions of specimen 37. In accordance with conventional electron microscopic techniques, such a shadow cast specimen as shown in FIGURE 4 may then be used to derive information regarding the characteristics of specimen 37, with the accuracy of this information being closely dependent upon the thickness coating of shadow cast conductive layer 40 applied thereto. Hence, the thickness of coating at the region across the gap 18, which is accurately measured by ohmmeter 20, corresponds to the thickness of coating applied to the specimen holder 25 proximate thereto, thereby providing increasingly accurate results over the previously known methods.

Reference is now made to FIGURES 5 and 7, which show a particularly advantageous base support member which has demonstrated successful operation in conjunction with shadow casing of grid specimen holders. In these figures, I preferably show a number of specimen holders 25–1 to 25–4 being spaced about the gap region 18 of base support member 10, thereby permitting simultaneous shadow casting of such a plurality of specimen holders. The number of such holders simultaneously cast naturally depends on their dimensions and the desired accuracy of results. Electrical terminal members 15, 17 are preferably identically constructed and are biased spring members containing opposed spaced apart arms 15–1, 15–2; 17–1, 17–2 interconnected by end sections 15–3, 17–3 respectively. Leads 19, 21 which connect terminals 15 and 17 to the imput terminals of a conventional type of ohmmeter (not shown), are suitably soldered, as at region 50, or otherwise secured to their respective terminal members.

In accordance with an advantageous aspect of my invention, I provide a shield member, generally shown as 60, to suitably limit the vapor deposition to that region containing the specimen holders 25 and gap 18. Shield 60 contains spaced apart upstanding portions 62 about windowed aperture 65. Spaced apart lower flange members 64, 66, 68 are provided to press-fit about the opposed sides of glass support base 12 (as best shown in FIGURE 6). Slidable members 70, 71 are suitably placed upon upstanding member 62 to provide an adjustment of the windowed region 65 thereof through which the vapor deposition is permitted. Securement of adjustable members 70 may preferably be provided by the biased arrangement of successively folded bends 72, 74, 76 such that the region intermediate the terminus 78 of bend 76 and the upstanding wall of member 70 will biasingly contain upstanding wall 62 of the shield member in a spring-like fashion.

The assembled unit is placed upon a non-conductive table 100 or other insulative member (such as a glass sheet), during use thereof, so as to prevent a short between terminals 15, 17.

It is, therefore, seen that my invention provides an improved method for accurately applying a thin conductive layer upon a member to be coated, with the invention having found particular utility in effecting increased reproducibility of shadow casting electron microscope grid specimen holders.

In the foregoing specification my invention has been described in conjunction with preferred embodiments. Many variations and modifications will, however, now become apparent to those skilled in the art, and I prefer, therefore, to be limited not by the specific disclosure contained herein but only by the appended claims.

The embodiments of the invention in which an exclusive privilege or property is claimed are defined as follows:

1. A method of forming a thin conductive coating of predetermined thickness, comprising the steps of: forming gap separated conductive regions upon an insulated base structure; electrically connecting said gap separated conductive regions to an impedance measuring instrument; placing a member to be coated upon a conductive region on said insulated base, adjacent said gap region; gradually applying a conductive coating by vapour deposition upon said member to be coated, and across said gap to establish an electrical path thereacross; measuring the impedance variation effected by the establishing of said conductive path across said gap; terminating the application of said conductive coating coresponding to said impedance variation being of a predetermined magnitude; removing said coated member from said base structure.

2. A method of vapor depositing a thin conductive coating of predetermined thickness, comprising the steps of: forming gap separated conductive regions upon an insulated base structure; electrically connecting said gap separated conductive regions to an impedance measuring instrument; placing a member to be coated upon a conductive region on said insulated base, adjacent said gap region; vapor despositing under vacuum a metallic conductive coating upon said member to be coated and across said gap to establish an electrical path thereacross; measuring the impedance variation effected by the establishing of said conductive path across said gap; terminating the vapor depositing of said conductive coating corresponding to said impedance variation being of a predetermined magnitude; removing said coated member from said base structure.

3. A method of forming a thin conductive coating of predetermined thickness comprising the steps of: applying spaced apart first conductive layers to an insulated base to form gap separated conductive regions; bonding said first conductive layers to said insulated base; electrically connecting said gap separated conductive regions to an impedance measuring instrument; placing a member to be coated upon said bonded conductive layer, adjacent said gap region; gradually applying a conductive coating upon said member to be coated, and across said gap to establish an electrical path thereacross; measuring the impedance variation effected by the establishing of said conductive path across said gap; terminating the application of said conductive coating corresponding to said impedance variation being of a predetermined magnitude; removing said coated member from said base structure.

4. The method of vapor depositing a thin conductive coating of predetermined thickness comprising the steps of: applying spaced apart first conductive layers to an insulated base to form gap separated conductive regions; bonding said first conductive layers to said insulated base; electrically connecting said gap separated conductive regions to an impedance measuring instrument; placing a member to be coated upon said bonded conductive layer, adjacent said gap region; vapor depositing under vacuum, a metallic conductive coating upon said member to be coated and across said gap to establish an electrical path thereacross; measuring the impedance variation effected by the establishing of said conductive path across said gap; terminating the vapor depositing of said conductive coating corresponding to said impedance variation being of a predetermined magnitude; removing said coated member from said base structure.

5. The method as set forth in claim 4, wherein said insulated base is formed of glass, and said first conductive layers are formed of gold, painted on said glass base;

6. The method as set forth in claim 4, wherein said insulated base is formed of glass, and said first conductive layers are formed of gold, painted on said glass base; said bonding is carried out by applying heat up to approximately 530° C.

7. The method as set forth in claim 4, wherein said vapor deposited conductive coating is of the group comprising platinum, gold, silver, nickel, chromium, aluminum, and carbon.

8. A method of shadow casting a grid specimen for electron microscopy, comprising the steps of: forming gap separated conductive regions upon an insulated base structure; electrically connecting said gap separated conductive regions to an impedance measuring instrument; placing at least one grid member, containing a specimen, upon a conductive region on said insulated base, adjacent said gap region; locating a vapor deposition source a known distance away from said grid member; vapor depositing a conductive coating upon said grid member and across said gap to establish an electrical path thereacross; measuring the impedance variation effected by the establishing of said conductive path across said gap; terminating the vapor depositing of said conductive coating corresponding to said impedance variation being of a predetermined magnitude; removing said coated member from said base structure.

9. A method of shadow casting a grid specimen for electron microscopy, comprising the steps of: applying spaced apart first conductive layers to an insulated base to form gap separated conductive regions; bonding said first conductive layers to said insulated base; electrically connecting said gap separated conductive regions to an impedance measuring instrument; placing at least one grid member, containing a specimen, upon a conductive region on said insulated base, adjacent said gap region; locating a vapor deposition source a known distance away from said grid member; vapor depositing under vacuum a conductive coating of effective electron scattering capabilities upon said grid member and across said gap to establish an electrical path thereacross; measuring the impedance variation effected by the establishing of said conductive path across said gap; terminating the vapor depositing of said conductive coating corresponding to said impedance variation being of a predetermined magnitude; removing said coated member from said base structure.

10. The method of shadow casting as set forth in claim 9, wherein said insulated base is formed of gold, painted on said glass base.

11. The method of shadow casting as set forth in claim 9, wherein said vapor deposited conductive coating is of the group comprising platinum, gold, silver, nickel, chrominum, aluminum, and carbon.

12. The method of shadow casting as set forth in claim 9, wherein said insulated base is formed of glass, and said first conductive layers are formed of gold, painted on said glass base; said bonding is carried out by applying heat up to approximately 530° C.

13. Apparatus for shadow casting a grid specimen for use in electron microscopy, comprising: a base member formed of electrically insulative material; first and second space separated electrically conductive regions formed upon an exterior surface of said base member, with said space separation providing a gap region between said first and second electrically conductive regions; first and second electrode means electrically connected to said first and said conductive regions respectively, and extending therefrom for measuring the series impedance of one of said conductive regions, said gap region, and the other of said conductive regions; one of said conductive regions upon said base member providing a surface for receiving at least one grid specimen holder, adjacent said gap region; means for gradually applying a conductive layer about the region including said grid specimen holder and said gap region, while simultaneously measuring said series impedance.

14. Apparatus for shadow casting as set forth in claim 13, wherein said electrically insulative base member is formed of glass, and said regions are formed of a thin coating of gold securely bonded to said glass base member.

15. Apparatus for shadow casting a grid specimen for use in electron microscopy, comprising; a base member formed of electrically insulative material; first and second space separated electrically conductive regions formed upon an exterior surface of said base member, with said space separation providing a gap region between said first and second electrically conductive regions; first and second electrode means electrically connected to said first and said conductive regions respectively, and extending therefrom for measuring the series impedance of one of said conductive regions, said gap region, and the other of said conductive regions; one of said conductive regions upon said base member providing a surface for receiving at least one grid specimen holder, adjacent said gap region; means for vapor depositing under vacuum a conductive layer about the region including said grid specimen holder and said gap region, while simultaneously measuring said series impedance.

(References on following page)

References Cited

UNITED STATES PATENTS

| | | | |
|---|---|---|---|
| 2,545,576 | 3/1951 | Godley | 324—65 X |
| 2,745,773 | 5/1956 | Weiner. | |
| 2,757,104 | 7/1956 | Howes | 117—227 X |
| 2,812,270 | 11/1957 | Alexander | 117—107 X |
| 2,978,364 | 4/1961 | Blaustein | 118—49 X |
| 3,018,191 | 1/1962 | Caban et al. | 117—71 X |
| 3,039,896 | 6/1962 | Cakenberghe et al. | 117—107 |
| 3,157,535 | 11/1964 | Radke | 118—9 |
| 3,237,508 | 3/1966 | Keller et al. | 117—107 |

OTHER REFERENCES

Hollad, Vacuum Deposition of Thin Films, published by John Wiley and Sons, 1956, pp. 386 to 388, 394 and 395.

ALFRED L. LEAVITT, *Primary Examiner.*

A. GOLIAN, *Assistant Examiner.*